(12) United States Patent
Schwung et al.

(10) Patent No.: US 7,867,612 B2
(45) Date of Patent: Jan. 11, 2011

(54) COMPOSITE MATERIAL, METHOD FOR THE PRODUCTION AND USE THEREOF

(75) Inventors: Klaus Peter Schwung, Ratingen (DE); Bernd Wohlmann, Dusseldorf (DE)

(73) Assignee: Toho Tenax Europe GmbH, Wuppertal (DE)

(*) Notice: Subject to any disclaimer, the term of this patent is extended or adjusted under 35 U.S.C. 154(b) by 1307 days.

(21) Appl. No.: 10/509,875

(22) PCT Filed: Mar. 28, 2003

(86) PCT No.: PCT/EP03/03234

§ 371 (c)(1),
(2), (4) Date: Jun. 3, 2005

(87) PCT Pub. No.: WO03/082565

PCT Pub. Date: Oct. 9, 2003

(65) Prior Publication Data

US 2005/0208284 A1 Sep. 22, 2005

(30) Foreign Application Priority Data

Apr. 3, 2002 (EP) .................. 02007534

(51) Int. Cl.
*D02G 3/00* (2006.01)
*C08G 75/14* (2006.01)
*C08G 75/02* (2006.01)

(52) U.S. Cl. ............... 428/375; 428/408; 428/366; 428/369; 428/371; 428/377; 528/125; 528/388; 524/609; 524/495; 524/496; 264/29.4

(58) Field of Classification Search ............ 428/408, 428/375, 371, 377, 369; 524/609, 495; 525/471
See application file for complete search history.

(56) References Cited

U.S. PATENT DOCUMENTS 4,489,129 A * 12/1984 Shue et al. ............ 428/366
4,910,289 A *  3/1990 Harris .................. 528/125
5,641,572 A *  6/1997 Yoshimura et al. ...... 428/408

FOREIGN PATENT DOCUMENTS

WO   WO 92/18431 A   10/1992

OTHER PUBLICATIONS

Morgan Tutorial. http://www/cje,/sc/edi/faculty/morgan. copyright 2006 USC Board of Trustees.*

* cited by examiner

*Primary Examiner*—Angela Ortiz
*Assistant Examiner*—Altrev C Sykes
(74) *Attorney, Agent, or Firm*—Oliff & Berridge, PLC

(57) ABSTRACT

A composite material is described that contains a reinforcing resin and reinforcing fibers, wherein the reinforcing fibers have a coating containing polyphenylene sulfide and the proportion of polyphenylene sulfide relative to the uncoated fibers is 0.001 to <0.01 wt. %. The composite material shows higher apparent interlaminar shear strength and bending strength as compared with similar composite materials having no PPS coating in the above concentration range.

15 Claims, No Drawings

COMPOSITE MATERIAL, METHOD FOR THE PRODUCTION AND USE THEREOF

CROSS-REFERENCE TO RELATED APPLICATION

The present application is a U.S. national stage application of International Application No. PCT/EP03/03234 filed on Mar. 28, 2003.

BACKGROUND OF THE INVENTION

1. Field of Invention

The invention relates to a composite material, a method for its production, and its uses.

2. Description of Related Art

Reinforcing fibers and their use, along with a composite resin, for production of composite materials are known. U.S. Pat. No. 5,641,572 describes reinforcing fibers made from short carbon fibers that contain, for example, polyphenylene sulfide (PPS) as a sizing agent. U.S. Pat. No. 5,641,572 teaches that the proportion of sizing agent relative to the total weight of short carbon fibers must be at least 0.01 percent by weight because for a proportion of less than 0.01 wt. % the protective effect is unsatisfactory. U.S. Pat. No. 5,641,572 also teaches of the carbonization of the sized short carbon fibers in an inert gas at 400 to 1500° C. Following this procedure, the short carbon fibers contain only the products of carbonization of the sizing agent. Finally, U.S. Pat. No. 5,641,572 discloses the production of a reinforcing material made from the carbonized short carbon fibers and a thermoplastic resin. U.S. Pat. No. 5,641,572 gives no indication of how the apparent interlaminar shear strength (ILSS) and bending strength of composite materials containing reinforcing fibers can be improved. It is precisely on these properties, however, that increasingly exacting demands are being placed.

SUMMARY OF THE INVENTION

The object of the present invention is therefore to increase the apparent interlaminar shear strength and the bending strength of composite materials containing reinforcing fibers.

These and other objects are achieved by a composite material containing a reinforcing resin and reinforcing fibers, the reinforcing fibers having a coating containing polyphenylene sulfide, characterized in that the proportion of polyphenylene sulfide relative to the uncoated reinforcing fibers is 0.001 to <0.01 wt. %.

If reinforcing fibers that have been coated in this way are processed by methods that are known into a composite material, it is found that the apparent interlaminar shear strength and the bending strength are higher than when reinforcing fibers are used that have not been coated according to the invention. This result is surprising because it could not have been foreseen that such small quantities of PPS would have any effect at all on the composite-material properties, much less that such small proportions by weight of PPS would improve the apparent interlaminar shear strength and the bending strength. Even more surprising is the finding that the apparent interlaminar shear strength and the bending strength of the composite materials of the invention show a maximum in the range of 0.001 to <0.01 wt. % of PPS relative to the reinforcing fibers. Composite materials of the invention that contain PPS-coated carbon reinforcing fibers and have been processed into a composite material with a polyetheretherketone, for example, show this maximum for a PPS-content, relative to the carbon fibers, of about 0.006% by weight.

DETAILED DESCRIPTION OF PREFERRED EMBODIMENTS

In a preferred embodiment of the composite material of the present invention, the proportion of polyphenylene sulfide relative to the uncoated reinforcing fibers is 0.002 to 0.009 wt. %.

In another preferred embodiment of the composite material of the invention, the coating comprises polyphenylene sulfide and a thermoplastic or duroplastic material, the thermoplastic preferably being a polyetherimide, polyetherketone, polyetheretherketone, polyethersulfone, polyetherethersulfone or polysulfone, and the duroplastic preferably is an epoxy resin.

The reinforcing resins used in the composite material of the invention are preferably thermoplastics such as polyetherimide, polyetherketone, polyetheretherketone, polyethersulfone, polyetherethersulfone or polysulfone, or a mixture of these thermoplastics.

The reinforcing fibers for the composite material of the invention can be any fibers of natural or synthetic origin that possess the properties required of reinforcing fibers, the required properties being particularly well developed when the reinforcing fibers are carbon fibers of pitch, polyacrylonitrile or rayon precursors, or aramid, glass, ceramic, boron, synthetic or natural fibers, or any combination of these fibers. Polyester fibers are especially preferred as synthetic fibers. Flax or sisal fibers are preferred as natural fibers.

A carbon reinforcing fiber especially preferred for the composite material of the invention is available under the name of Tenax HTS® from Tenax Fibers GmbH, Wuppertal, Germany. In the composite material of the invention, the fibers may be present as short-cut fibers or as filament yarn that can comprise several thousand filaments, and preferably between 3,000 and 24,000 filaments. The fibers in the composite material of the invention can also be present in the form of a textile fabric such as a woven, nonwoven, knitted or crocheted fabric, or as a unidirectional or multidirectional scrim.

Objects of the invention are further achieved by a method for production of a composite material comprising the steps a) providing reinforcing fibers that have been pretreated if required, b) applying a coating containing polyphenylene sulfide on the reinforcing fibers of step a), such that the coating contains 0.001 to <0.01% wt. % of polyphenylene sulfide relative to the reinforcing fibers, resulting in the production of coated reinforcing fibers, and c) processing the coated reinforcing fibers of step b) into a composite material, using a reinforcing resin.

In step a), any method of providing the reinforcing fibers is suitable that makes the entire surface of the fibers accessible for the coating to be applied in step b). For example, the freshly spun and dried reinforcing fibers can be fed directly into the production method, either individually or as a yarn sheet, before winding up. Alternatively, the reinforcing fibers can be provided as filament yarn comprising several thousand filaments, preferably about 3,000 to 24,000 filaments.

The reinforcing fibers for step a) of one method of the invention can be any fibers of natural or synthetic origin that possess the properties required of reinforcing fibers. The required properties being particularly well developed when the reinforcing fibers are carbon fibers of pitch, polyacrylonitrile or rayon precursors, or aramid, glass, ceramic, boron, synthetic or natural fibers, or combinations of these fibers. Polyester fibers are especially preferred as synthetic fibers. Flax or sisal fibers are preferred as natural fibers. Carbon fibers obtainable under the name Tenax HTS® from the firm of Tenax Fibers GmbH, Wuppertal, Germany, are especially preferred as the carbon reinforcing fibers in step a) of the method of the invention.

The reinforcement fibers provided in step a) of the method of the invention are pretreated if necessary for adequate wetting of the reinforcing fibers with the coating to be applied in step b) and for adhesion of the coating to the reinforcing fibers. Pretreatment of the reinforcing fibers can also improve adhesion of the coated fibers to the reinforcement resin used in step c), if the reinforcing fibers in step b) have not been provided with the coating over their entire surface. If required, the method used for pretreatment can be an impregnation method, wherein the reinforcing fibers are immersed in hydrophobic or hydrophilic liquid media and dried. Pretreatment methods may also be used in which reactive functional groups are introduced on the surface of the fiber as in electrochemical oxidation, which provides the surface of the reinforcing fibers with, for example, hydroxyl and carboxyl groups.

For the application in step b), any method is suitable that is capable of applying onto a reinforcing fiber between 0.001 and <0.01 wt. % of polyphenylene sulfide relative to the weight of the reinforcing fibers.

For example, the reinforcing fibers can be conducted in step b) through a PPS melt, having optionally been previously conducted through a melt of a thermoplastic such as polyetherimide. It is also possible to prepare a melt of PPS and a thermoplastic such as polyetherimide, and to conduct the reinforcing fibers through the melt containing both polymers.

Alternatively, PPS powder can be introduced into a plasma, whereby the PPS particles are accelerated in the direction of the reinforcing fibers. On encountering the reinforcing fibers, the PPS particles solidify and form the required layer on the reinforcing fibers. This plasma spray coating with PPS can be preceded by plasma spray coating with a thermoplastic such as polyetherimide. It is also possible to use PPS and a thermoplastic such as polyetherimide simultaneously in the plasma spray coating.

Furthermore, PPS application can be integrated into the production process for the reinforcing fibers before wind-up, in which case the known devices for application of finishing agents can be used. A thermoplastic such as polyetherimide can optionally be applied before PPS application. Alternatively, a sizing agent can be prepared from PPS and a thermoplastic such as polyetherimide, and this sizing agent can then be applied to the reinforcing fibers.

In another embodiment of the method of the invention, the PPS, in the form of crystallites, is applied on the reinforcing fibers in, for example, step b) wherein the reinforcing fibers from step a) are conducted through a bath containing a suspension of PPS, dried and wound up. There are no special requirements on the temperature of the bath, provided that at the chosen temperature, the finest possible crystallites of PPS are desirably present in the suspension. In various embodiments of the invention, this is true even at room temperature, which is therefore the preferred temperature for the bath. During drying, it is important to prevent decomposition of the coating while also ensuring that moisture adhering to the coated reinforcing fibers is removed. A dryer temperature in the range of 350° C. to 400° C. is suitable in many cases, the temperature being selected according to the drying time. The reinforcing fibers can optionally first be conducted through a bath containing a solution of a thermoplastic such as polyetherimide, and the fibers that have been wetted with the solution then conducted through a bath containing a suspension of PPS. Then the fibers would be wound up and dried as described above.

It is especially preferred that the reinforcing fibers, which may for example be present as filament yarn with 3,000 to 24,000 filaments, be conducted through a bath. The contents of the bath comprise a suspension of PPS, a solution of a thermoplastic such as a polyetherimide solution, a solvent, and, if required, an emulsifier. After the reinforcing fibers are conducted through the bath, the fibers are dried and wound up as described. The solvent is chosen so that it dissolves the thermoplastic but not the PPS. A suitable solvent, when the thermoplastic is polyetherimide, is for example, 1-methyl-2-pyrrolidone (NMP). An example of a suitable emulsifier is decaethylene glycol oleyl ether. In this case, and in all embodiments of the method of the invention in which a PPS suspension in a bath is used, the suspension is maintained by keeping the bath contents continuously in motion by, for example, pump circulation or stirring. While the reinforcing fibers are conducted through the bath, the yarn tension is preferably 0.3 to 1.5 cN/tex, and more preferably 0.5 to 1.0 cN/tex. The speed at which the reinforcing fibers are conducted through the suspension is preferably 60 to 600 m/h, and especially preferably 120 to 480 m/h. The concentration of the PPS suspended in the bath is preferably 0.2 to 5 wt. %, and especially preferably 0.5 to 1.5 wt. % of PPS, relative in each case to the polyetherimide content, the proportion of which in the bath contents is, for example, in the range of 0.5 to 1.0 wt. %, and especially preferably in the range 0.5 to 0.7 wt. %. The parameters cited above are adjusted in such a way that a coating of, for example, 0.5 to 1.0 wt. % and especially preferably of 0.5 to 0.7 wt. % results.

A suspension with finely divided PPS crystallites is obtained when the thermoplastics and PPS are placed in an extruder in the above-mentioned proportion by weight and are melted to obtain a granulate. This granulate is then introduced into the above-mentioned solvent, which may contain an emulsifier if required. The thermoplastic dissolves and the PPS forms a fine-particle suspension. The PPS proportion, in the reinforcing fiber can be adjusted by adjusting the PPS concentration in the bath through which the reinforcing fibers pass at the prescribed speed, such that the coated reinforcing fibers contain 0.001 to <0.01 wt. % of PPS.

The proportion by weight of the coating on the reinforcing fibers is determined by Method B in DIN EN ISO 10548. If the coating of the fibers contains a thermoplastic in addition to PPS, the proportion by weight of PPS in the coated reinforcing fibers is calculated from the ratio of the weights of thermoplastic and PPS used for coating.

In step c) of the method of the invention, the coated reinforcing fibers are processed with a reinforcing resin, preferably a thermoplastic or a mixture of thermoplastics, to give a composite material. Suitable thermoplastics include polyetherimides, polyetherketones, polyetheretherketones, polyethersulfones, polyetherethersulfones or polysulfone, or a mixture of these thermoplastics. The methods by which the reinforcing fibers coated by the method of the invention are processed into composite materials are known. They include, for example, (1) mixing of reinforcing fibers that have been coated by the method of the invention with fibers or a powder or a film of composite resin and subsequent hot pressing, (2) impregnation of reinforcing fibers that have been coated by the method of the invention with a melt or solution of composite resin, and (3) compounding of reinforcing fibers that have been coated by the method of the invention and cut to short fibers.

The reinforcing fibers that have been coated by the method of the invention can be further processed to a composite material in the form in which they occur after step b), e.g., as filament yarn.

Alternatively, the coated reinforcing fibers resulting from step b) of the method of the invention could first be brought into the form of a textile fabric and processed in this form into a composite material. For example, the coated reinforcing fibers resulting from step b) could first be processed into a nonwoven fabric or cut into short fibers. The reinforcing fibers coated by the method of the invention could also first be brought into the form of a woven, braided, knitted or crocheted fabric, or of a unidirectional or multidirectional scrim.

In the production of the composite material in step c), the coated reinforcing fibers show outstanding impregnation behavior on hot pressing with polyetheretherketone in regard to penetration of the polyetheretherketone into the filament yarn as well as wetting of the individual coated filaments. The composite materials of the invention have a fiber proportion of 40 to 70 vol. %, the fiber proportion for laminates of unidirectional prepregs preferably lying in the range of 55 to 65 vol. %, for laminates of fabric prepregs in the range of 45 to 55 vol. %, and for wound or pultruded bodies in the range of 55 to 70 vol. %.

The apparent interlaminar shear strength of the composite materials of the invention is measured as in DIN EN 2563, and the bending strength (0° in the fiber direction and 90° perpendicular to the fiber direction) as in DIN EN 2562.

The composite material of the invention and composite material produced by the method of the invention can advantageously be used to produce components for aircraft construction, such as the body and landing flaps; for automobile construction, such as engine parts, pumps and seals; for machine construction and plant construction, such as seals, bearings and tanks; and for production of medical components such as surgical instruments.

The invention will now be described in more detail with the help of the following examples.

Example 1

98 parts by weight of polyetherimide (Ultem® from GE Plastics) and 2 parts by weight of PPS (Fortron® from Ticona) are placed in an extruder and melted, and a granulate is produced. 39 g of the granulate is stirred into 590 g of hot 1-methyl-2-pyrrolidone (NMP) until the polyetherimide has dissolved; The PPS does not dissolve, and forms a suspension. A mixture consisting of 200 g of NMP, 60 g of water and 20 g of the emulsifier decaethylene glycol oleyl ether is added dropwise to the stirred polyetherimide solution and PPS suspension, which has been cooled to 70° C. The resulting mixture is stirred into 600 ml of warm water at 50° C. so that an emulsion is formed, which is kept in continuous motion by pump circulation. The obtained solution is diluted with water until the resulting solution consists of 0.6 wt. % of polyetherimide, 0.006 wt. % of PPS, 0.3 wt. % of decaethylene glycol oleyl ether, 12.2 wt. % of NMP and 86.894 wt. % of water.

A filament yarn with a linear density of 800 tex and made from carbon fibers, which are available under the name Tenax HTS® from Tenax Fibers GmbH and have been pretreated by electrochemical oxidation, are conveyed through the emulsion described above with a yarn tension of 1.0 cN/tex and at a speed of 180 m/h, dried at 350° C. and wound up. The proportion of PPS relative to the carbon fibers is 0.006 wt. % (see Table, Example 1).

The filament yarn is processed into a composite material with polyetheretherketone, available under the name PEEK® 151 G from Victrex. The polyetheretherketone is used in the form of a film. This film and the coated Tenax HTS® fibers are arranged in alternating layers, which are then laminated together at a pressure of approximately 9 bar and a temperature just above 400° C. Following lamination, the temperature in the composite material is reduced to room temperature within 24 h.

The apparent interlaminar shear strength is 143 MPa, the bending strength (0°) is 3380.4 MPa, and the bending strength (90°) is 187 MPa (see Table, Example 1).

Example 2

Example 1 is repeated with the difference that the emulsion consists of 0.597 wt. % of polyetherimide, 0.009 wt. % of PPS, 0.3 wt. % of decaethylene glycol oleyl ether, 12.2 wt. % of NMP and 86.894 wt. % of water. The proportion of PPS relative to the carbon fibers is 0.009 wt. % (see Table, Example 2).

The interlaminar shear strength is 125 MPa, the bending strength (0°) is 2972.1 MPa, and the bending strength (90°) is 153 MPa (see Table, Example 2).

Comparative Example

Example 1 is repeated with the difference that the emulsion contains no PPS and consists of 0.606 wt. % of polyetherimide, 0.3 wt. % of decaethylene glycol oleyl ether, 12.2 wt. % of NMP and 86.894 wt. % of water (see Table, Comparative 3).

The apparent interlaminar shear strength is 121 MPa, the bending strength (0°) is 2473.3 MPa, and the bending strength (90°) is 152 MPa (see Table, Comparative 3).

The following table shows the percentage by weight of PPS relative to the carbon fibers (wt. % PPS), the interlaminar shear strength (ILSS), the bending strength (0°) as BS (0°) and the bending strength (90°) as BS (90°).

| Example | wt. % PPS | ILSS MPa | BS (0°) MPa | BS (90°) MPa |
|---|---|---|---|---|
| 1 | 0.006 | 143 | 3380.4 | 187 |
| 2 | 0.009 | 125 | 2972.1 | 153 |
| Comparative 3 | 0.000 | 121 | 2473.3 | 152 |

It is seen from the table that the ILSS and the BS at 0° and 90° are maximum for a PPS proportion of 0.006 wt. % relative to the carbon fibers.

The invention claimed is:

1. A composite material comprising:
a reinforcing resin, and
coated reinforcing fibers each comprising a reinforcing fiber and a coating, the coating comprising polyphenylene sulfide,
wherein a proportion of polyphenylene sulfide relative to the reinforcing fibers is 0.002 to 0.009 percent by weight.

2. Composite material according to claim 1, wherein the coating comprises polyphenylene sulfide and a thermoplastic or duroplastic material.

3. Composite material according to claim 1, wherein the reinforcing resin is a thermoplastic or a mixture of thermoplastics.

4. Composite material according to claim 1, wherein the reinforcing fibers are carbon fibers of pitch, polyacrylonitrile or rayon precursors, or aramid, glass, ceramic, boron, synthetic, natural fibers, or combinations of these fibers.

5. A method for producing a composite material comprising the steps
   a) providing reinforcing fibers that have been optionally pretreated,
   b) applying a coating containing polyphenylene sulfide on the reinforcing fibers of step a), such that the coating contains 0.002 to 0.009 percent by weight of polyphenylene sulfide relative to the reinforcing fibers, resulting in production of coated reinforcing fibers, and
   c) processing the coated reinforcing fibers of step b) into a composite material, with a reinforcing resin.

6. Method according to claim 5, wherein the reinforcing fibers of step a) are carbon fibers of pitch, polyacrylonitrile or rayon precursors, or aramid, glass, ceramic, boron, synthetic, natural fibers, or combinations of these fibers.

7. Method according to claim 5, wherein the carbon reinforcing fibers of step a) have been pretreated by electrochemical oxidation.

8. Method according to claim 5, wherein the reinforcing fibers of step a) are conducted through a bath containing a suspension of polyphenylene sulfide, dried and wound up in step b).

9. Method according to claim 8, wherein the bath also contains a solution of a thermoplastic.

10. Method according to claim 5, wherein the coated reinforcing fibers in step c) are processed in a form of filament yarns, short fibers, woven, braided, knitted or crocheted fabrics, nonwovens, unidirectional scrims or multidirectional scrims into a composite material.

11. Components for aircraft construction, automobile construction, machine construction or plant construction, and medical components, comprised of the composite material according to claim 1.

12. Coated reinforcing fibers each comprising a reinforcing fiber and a coating, the coating comprising polyphenylene sulfide, wherein a proportion of polyphenylene sulfide relative to the reinforcing fibers is 0.002 to 0.009 wt. %.

13. Coated reinforcing fibers according to claim 12, wherein the coating comprises polyphenylene sulfide and a thermoplastic or duroplastic.

14. Coated reinforcing fibers according to claim 12, wherein the reinforcing fibers are carbon fibers of pitch, polyacrylonitrile or rayon precursors, or aramid, glass, ceramic, boron, synthetic, natural fibers, or combinations of these fibers.

15. Composite material according to claim 1, wherein a proportion of the reinforcing fibers is 40% to 70% by volume of the composite material.

* * * * *

UNITED STATES PATENT AND TRADEMARK OFFICE
CERTIFICATE OF CORRECTION

| | | |
|---|---|---|
| PATENT NO. | : 7,867,612 B2 | Page 1 of 1 |
| APPLICATION NO. | : 10/509875 | |
| DATED | : January 11, 2011 | |
| INVENTOR(S) | : Klaus Schwung et al. | |

It is certified that error appears in the above-identified patent and that said Letters Patent is hereby corrected as shown below:

Please amend the title page as follows:

Item (54), please change "COMPOSITE MATERIAL, METHOD FOR THE PRODUCTION AND USE THEREOF" to -- COMPOSITE MATERIAL, METHOD OF PRODUCTION AND USES THEREOF --.

Please amend the title page as follows:

Item (30), please change to "02007534.7"

Signed and Sealed this
Twenty-second Day of March, 2011

David J. Kappos
*Director of the United States Patent and Trademark Office*

UNITED STATES PATENT AND TRADEMARK OFFICE
CERTIFICATE OF CORRECTION

PATENT NO.        : 7,867,612 B2                                         Page 1 of 1
APPLICATION NO.   : 10/509875
DATED             : January 11, 2011
INVENTOR(S)       : Klaus Schwung et al.

It is certified that error appears in the above-identified patent and that said Letters Patent is hereby corrected as shown below:

Title page, Item (54) and at column 1, lines 1 and 2,

Please amend the title as follows:

Please change "COMPOSITE MATERIAL, METHOD FOR THE PRODUCTION AND USE THEREOF" to -- COMPOSITE MATERIAL, METHOD OF PRODUCTION AND USES THEREOF --.

Please amend the title page as follows:

Item (30), please change to "02007534.7"

This certificate supersedes the Certificate of Correction issued March 22, 2011.

Signed and Sealed this
Twenty-sixth Day of April, 2011

David J. Kappos
*Director of the United States Patent and Trademark Office*